United States Patent [19]

D'Ocon Guerrero

[11] Patent Number: 5,042,941

[45] Date of Patent: Aug. 27, 1991

[54] PROCESS FOR PRODUCING ANIMATED FILMS

[76] Inventor: Antoni D'Ocon Guerrero, Corcega No. 341, 08037-Barcelona, Spain

[21] Appl. No.: 547,686

[22] Filed: Jul. 2, 1990

[30] Foreign Application Priority Data

Jul. 4, 1989 [ES] Spain ................................. 8902368

[51] Int. Cl.$^5$ .............................................. G03B 19/18
[52] U.S. Cl. ...................................... 352/51; 352/50; 352/87; 352/46; 352/47
[58] Field of Search ...................... 352/50, 51, 52, 87, 352/46, 47

[56] References Cited

U.S. PATENT DOCUMENTS

| | | | |
|---|---|---|---|
| 3,228,742 | 1/1966 | Hand | 352/51 |
| 4,666,271 | 5/1987 | Gonsot | 352/87 |
| 4,893,198 | 1/1990 | Little | 352/87 |
| 4,952,051 | 8/1990 | Lovell et al. | 352/87 |

*Primary Examiner*—Monroe H. Hayes
*Attorney, Agent, or Firm*—Ostrolenk, Faber, Gerb & Soffen

[57] ABSTRACT

A process of producing animated films which permits greater rapidity in the filming, while at the same time reducing the cost. The process comprises the steps of: a) photographing a single time by a camera a black and white drawing of each of the components of each plane, without background; b) coloring the photographed images by an electronic brush and storing them on a hard disk; c) recovering the different drawings from the hard disk, mixing the different planes of the foreground, creating a movement of animation; d) transferring the resultant images to a videotape; e) directly recording the backgrounds or ambience which are stored on a separate videotape; and f) mixing the images of the two videotapes.

1 Claim, No Drawings

PROCESS FOR PRODUCING ANIMATED FILMS

BACKGROUND OF THE INVENTION

The present invention relates to a process for producing animated films, known as films or series of animated drawings.

Up to the present time, animation movies, known as films or series of animated drawings, were produced in artisan-like manner starting from drawings created by an animator which were colored on an acetate. Subsequently these drawings were superimposed and filmed still by still. Obviously this is an overly simplified and brief explanation of the filming of an animated drawing, but it is sufficiently descriptive to understand that the process was slow, arduous, difficult and expensive, since practically all the stills had to be produced so that they would be of good quality and the animation would be suitable.

Later on, the orientals attempted to animate drawings by computer The result obtained was not acceptable and they succeeded merely in standardizing the movements of the drawings by the same traditional system and with the use of a large number of persons. They succeeded in somewhat reducing the expense of traditional animation and succeeded in conquering practically the worldwide market, invading, during the last era, all television broadcast networks.

Countries such as France, the United States, Belgium, etc. tried to develop technologies which, by data processing, would lower expenses and thus obtain a larger share of the market. The result, however, has been poor up to now, since data processing only delimited the movement and standardized the drawing even more than what had been done by the orientals.

SUMMARY OF THE INVENTION

The object of the present invention is to develop a process which makes it possible to film the frames with greater rapidity, lowering the expenses and imparting the drawing the conventional movement it had had before the standardization.

In accordance with the method of the invention one starts, for each of the animated components or elements of the foreground, from a black and white drawing which is photographed by a camera only once. Then, by means of an electronic brush the different images obtained are colored and stored on a hard disk.

Once all the drawings have undergone this process, they are colored by the artist, the different planes of the foreground being mixed. With the result obtained, a movement of animation is created and the resultant images are transferred to videotape.

The background and animation are photographed directly by a camera and stored on a videotape different form the one which contains the movements of animation of the above-mentioned images.

As final phase of the process, the images of the two videotapes are mixed, obtaining as a result a very clear drawing with a much more vivid coloring which, after the resultant tape has been subjected to the entire post-production process (editing, dubbing, etc.), results in a new system or process for producing or making animated drawings much more rapidly and of better quality.

DESCRIPTION OF THE SYSTEM FOR THE DIGITAL TREATMENT OF IMAGES

Purpose

The image digital treatment system has been designed in order to accelerate and streamline methods of coloring and filming for the production of animated cartoons.

Description of the System

The digital image treatment system is divided into four basic operating phases, namely:
digitalization of the cartoons
coloring of the cartoons
programming and recording of the animations and output to video The system is applied to a given graphical unit formed of the following parts:
cartoons drawn with a pencil on pivoted and coded sheets of white paper
shooting cards
storyboards
backgrounds

Digitalization of the Cartoons

The cartoons which are formed of an animated sequence or "foreground" are drawn with black pencil on individual sheets of white paper, duly pivoted and coded. The sheets are placed, one by one, on the pivots where they are digitalized by a scanner, the output of which is connected to a data system. A special digitalization program converts the image recorded by the camera into a purely digital image in which only the black lines are retained, the white surfaces which correspond to the paper being transformed to "transparent". The program furthermore memorizes the pivoting of the drawing, that is to say its position relative to the frame. This digital image is stored on an external storage medium (hard disk, diskette) in the form of a file the name of which is the code which appears on the sheet of paper from which it comes. Once all the cartoons of a foreground have been digitalized, said foreground is converted into a series of files stored in the computer.

Coloring of the Cartoons

In order to color the cartoons, the operator has a graphical table, a light pen and a special coloring program. The coloring program "reads" the files generated in the preceding phase and converts them back into physical images which are visible on a video monitor. The operator now selects the color desired and, by means of the light pen, "signals" the area of the drawing to be filled with said color. The color then "flows" freely over the entire surface until completely filling it. This action is usually very fast with an average duration of about 0.2 to 0.4 seconds, and is only prolonged when the surface is very large (if, for instance, the surface covers almost the entire screen) or if it is extremely complicated ("labyrinth" surfaces). Once the operator has colored all the surfaces of a drawing, said drawing is then again stored in the form of a file without change of name, which means merely the replacement of the original "uncolored" filed by another "colored" file. The advantage of this system over the traditional system of manual coloring, in addition to its extreme rapidity, is the possibility subsequently of correcting errors in coloring. The operator can, in fact, at any time modify or "erase" the color of a drawing which has been previously colored by simply selecting said drawing, electing the new color, and "signalling" the surface to be modified.

Programming and Recording of the Animations

Once all the cartoons or files which form a foreground have been colored, said foreground can now be "animated". The animation program permits the introduction of the parameters referring to the combination and stay on screen code of the different cartoons and controls a magnetoscope. From the filming card, the operator introduces said parameters into the program and verifies the correct development of the animation. Any error in programming or in the filming card can be easily and rapidly corrected. The operator then indicates the program which he proceeds to record on the foreground. Since the animation program exerts complete control over the magnetoscope, the recording process as such does not require the intervention of the operator. The result obtained in this phase is an animated sequence or "foreground" recorded on a videotape.

Conclusion

The automatic coloring makes it possible to color the cartoons at a speed which is 10 to 20 times faster than traditional manual coloring. Due to the reversible character of the coloring process, it is furthermore possible to correct any error in color easily and on the fly, even in the phases subsequent to this process. Therefore, a high degree of saving both of time and of personnel is obtained, as well as a high degree of streamlining, since possible errors do not make it necessary to recommence the entire coloring process.

The integrating of real-time backgrounds permits faster filming as compared with the traditional shooting, which makes it possible to "photograph" each photograph separately. The integration of real-time backgrounds furthermore makes it possible to pre-edit entire sequences on original tapes, which means a considerable saving of time in the post-production processes.

For all the reasons set forth above, the objective indicated in Section 1 can be considered to have been fully covered. The system for digital processing of images contributes considerable acceleration and streamlining of two of the decisive phases in the production of animated cartoons, namely the coloring and the filming.

Having sufficiently described the nature of the invention as well as the manner of carrying it out in practice, it is to be pointed out that the arrangements indicated above are capable of changes in detail insofar as they do not alter its basic principle.

What is claimed is:

1. A method for producing an animated film, characterized by the fact that it comprises the steps of:
   a) photographing a single time by a camera a black and white drawing of each of the components of each plane, without background;
   b) coloring the photographed images by electronic brush and storing them on a hard disk;
   c) recovering the different drawings from the hard disk in order to effect the mixing of the different planes of the foreground, creating a movement of animation;
   d) transferring the images obtained to a videotape;
   e) directly photographing the backgrounds or ambience by a camera in order to be stored on a separate videotape; and
   f) mixing the images stored on the two videotapes.

* * * * *